US011650631B2

(12) United States Patent
Watamura et al.

(10) Patent No.: US 11,650,631 B2
(45) Date of Patent: May 16, 2023

(54) STAND DEVICE AND ELECTRONIC APPARATUS

(71) Applicant: LENOVO (SINGAPORE) PTE. LTD., Singapore (SG)

(72) Inventors: Kenji Watamura, Yokohama (JP); Kazuo Fujii, Yokohama (JP); Takayuki Morino, Yokohama (JP); Madison Smith, Morrisville, NC (US); Cuong Truong, Morrisville, NC (US); Thomas Perelli, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 36 days.

(21) Appl. No.: 17/444,747

(22) Filed: Aug. 9, 2021

(65) Prior Publication Data

US 2023/0044946 A1    Feb. 9, 2023

(51) Int. Cl.
*G06F 1/16*  (2006.01)
*F16M 11/38*  (2006.01)
*F16B 1/00*  (2006.01)

(52) U.S. Cl.
CPC .............. *G06F 1/166* (2013.01); *F16B 1/00* (2013.01); *F16M 11/38* (2013.01); *G06F 1/1681* (2013.01); *F16B 2001/0035* (2013.01)

(58) Field of Classification Search
None
See application file for complete search history.

(56) References Cited

U.S. PATENT DOCUMENTS

| | | | | |
|---|---|---|---|---|
| 9,095,061 B2* | 7/2015 | Coberly | ................. | F16M 11/38 |
| 9,164,551 B2* | 10/2015 | Chen | ..................... | G06F 1/1669 |
| 9,451,818 B2* | 9/2016 | Buechin | ............. | A45C 13/1069 |
| 9,496,102 B2* | 11/2016 | Bates | ..................... | H01H 13/86 |
| 10,114,423 B2* | 10/2018 | Sharma | .................. | A45C 11/00 |
| 10,314,416 B2* | 6/2019 | Kim | ......................... | A47G 1/06 |
| 11,209,870 B1* | 12/2021 | Li | .......................... | F16M 11/10 |
| 11,277,929 B2* | 3/2022 | Ku | ......................... | G06F 1/203 |
| 2013/0258586 A1* | 10/2013 | Shao | ..................... | G06F 1/1613 |
| | | | | 248/688 |
| 2016/0073544 A1* | 3/2016 | Heyd | ..................... | G06F 1/185 |
| | | | | 361/679.31 |

FOREIGN PATENT DOCUMENTS

JP        2017068732 A      4/2017

* cited by examiner

*Primary Examiner* — Anthony Q Edwards
*Assistant Examiner* — Rashen E Morrison
(74) *Attorney, Agent, or Firm* — Shimokaji IP

(57) ABSTRACT

A stand device includes a base block, a first stand plate, a second stand plate, a third stand plate, a first hinge device that connects the first stand plate to the base block, a second hinge device that connects the first stand plate and the second stand plate, a third hinge device that connects the second stand plate and the third stand plate, and a fourth hinge device that connects the third stand plate to the base block. The stand device is configured so that the rotation axis of the third hinge device is located on an extension of the rotation axis of the first hinge device and the rotation axis of the fourth hinge device is located on an extension of the rotation axis of the second hinge device.

4 Claims, 12 Drawing Sheets

STAND DEVICE AND ELECTRONIC APPARATUS

FIELD OF THE INVENTION

The present invention relates to a stand device and an electronic apparatus including such a stand device.

BACKGROUND OF THE INVENTION

An electronic apparatus such as a tablet PC may be used in an upright position using a stand device. A similar stand device may be used also for a foldable tablet PC having a flexible display (see Japanese Unexamined Patent Application Publication No. 2017-068732, for example).

SUMMARY OF THE INVENTION

Those electronic apparatuses are typically equipped with a display that is a horizontally-oriented rectangle in shape. A user may want to use such an electronic apparatus in a vertical posture, instead of the typical horizontal posture. A typical stand device to be mounted on the rear face of an electronic apparatus, however, supports the horizontal posture of the electronic apparatus only, as in the stand device of Japanese Unexamined Patent Application Publication No. 2017-068732. In particular, an electronic apparatus having a flexible display as in Japanese Unexamined Patent Application Publication No. 2017-068732 may have chassis that are horizontally longer than other types. It is not easy to stably support such an electronic apparatus both in horizontal and vertical postures.

In view of the problems of the conventional techniques, the present invention aims to provide a stand device capable of stably supporting an electronic apparatus both in the horizontal and vertical standing postures, and an electronic apparatus equipped with such a stand device.

A stand device according to the first aspect of the present invention includes: a base block having a first side face and a second side face intersecting the first side face; a first stand plate having a first edge opposed to the first side face, and a second edge intersecting the first edge and aligning with an extension of the second side face; a second stand plate having a third edge opposed to the second edge, and a fourth edge intersecting the third edge and aligning with an extension of the first edge; a third stand plate having a fifth edge opposed to the fourth edge, and a sixth edge intersecting the fifth edge, being opposed to the second side face and aligning with an extension of the third edge; a first hinge device that connects the first side face and the first edge to connect the first stand plate to be rotatable relative to the base block; a second hinge device that connects the second edge and the third edge to connect the first stand plate and the second stand plate to be relatively rotatable; a third hinge device that connects the fourth edge and the fifth edge to connect the second stand plate and the third stand plate to be relatively rotatable; and a fourth hinge device that connects the fifth edge and the second side face to connect the third stand plate to be rotatable relative to the base block. The third hinge device has a rotation axis on an extension of a rotation axis of the first hinge device. The fourth hinge device has a rotation axis on an extension of a rotation axis of the second hinge device.

An electronic apparatus according to the second aspect of the present invention includes: a chassis; a stand device disposed on a rear face of the chassis. The stand device includes: a base block having a first side face and a second side face intersecting the first side face; a first stand plate having a first edge opposed to the first side face, and a second edge intersecting the first edge and aligning with an extension of the second side face; a second stand plate having a third edge opposed to the second edge, and a fourth edge intersecting the third edge and aligning with an extension of the first edge; a third stand plate having a fifth edge opposed to the fourth edge, and a sixth edge intersecting the fifth edge, being opposed to the second side face and aligning with an extension of the third edge; a first hinge device that connects the first side face and the first edge to connect the first stand plate to be rotatable relative to the base block; a second hinge device that connects the second edge and the third edge to connect the first stand plate and the second stand plate to be relatively rotatable; a third hinge device that connects the fourth edge and the fifth edge to connect the second stand plate and the third stand plate to be relatively rotatable; and a fourth hinge device that connects the fifth edge and the second side face to connect the third stand plate to be rotatable relative to the base block. The third hinge device has a rotation axis on an extension of a rotation axis of the first hinge device. The fourth hinge device has a rotation axis on an extension of a rotation axis of the second hinge device.

The above-described aspects of the present invention are capable of stably supporting an electronic apparatus both in horizontal and vertical standing postures.

DETAILED DESCRIPTION OF THE INVENTION

Referring to the attached drawings, the following describes a stand device according to the present invention in details by way of a preferable embodiment about the relationship with an electronic apparatus having this device mounted thereto.

Figure 1:
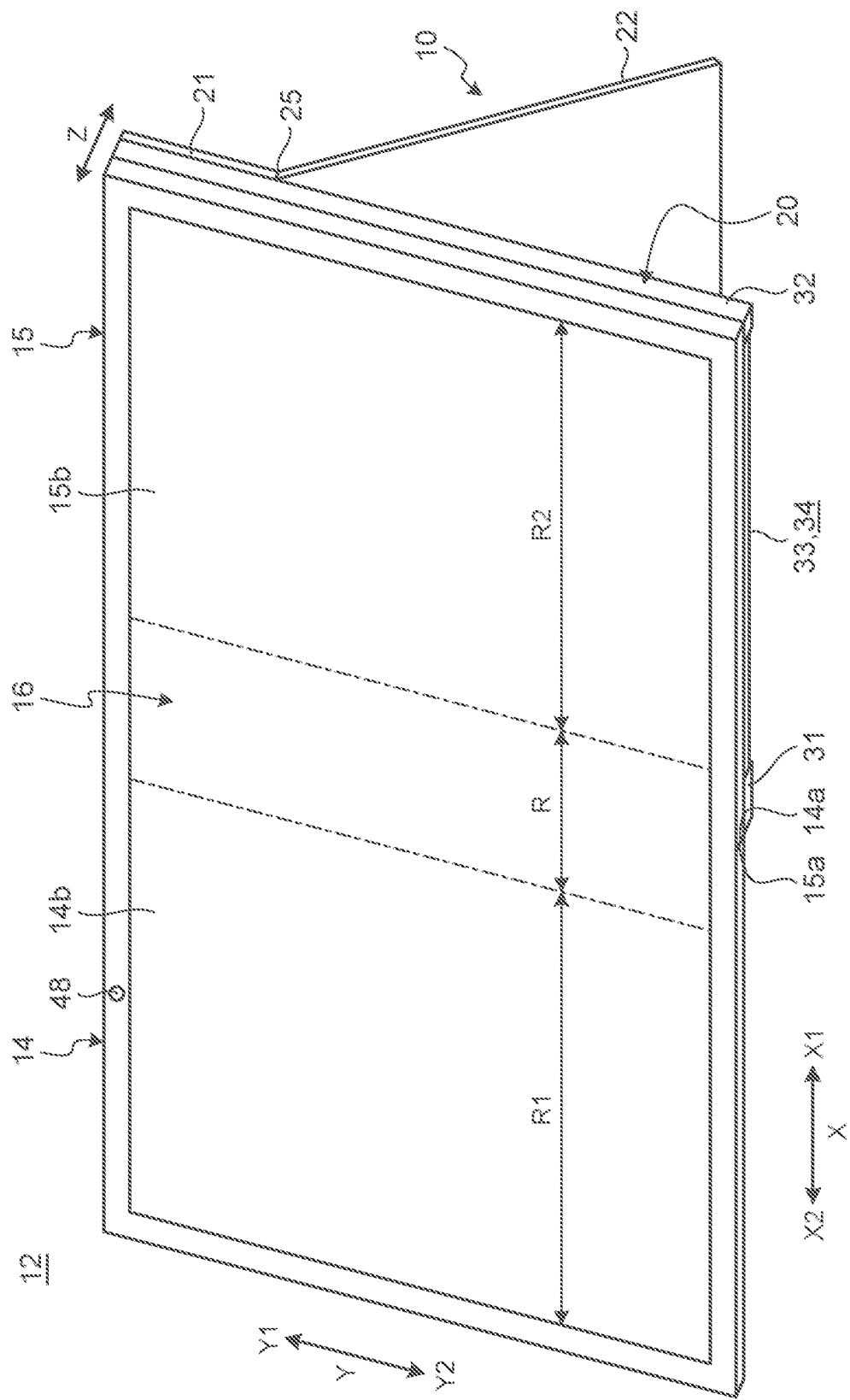
FIG. 1 is a schematic perspective view of an electronic apparatus equipped with a stand device according to one embodiment, in a horizontal standing posture.
Figure 2:
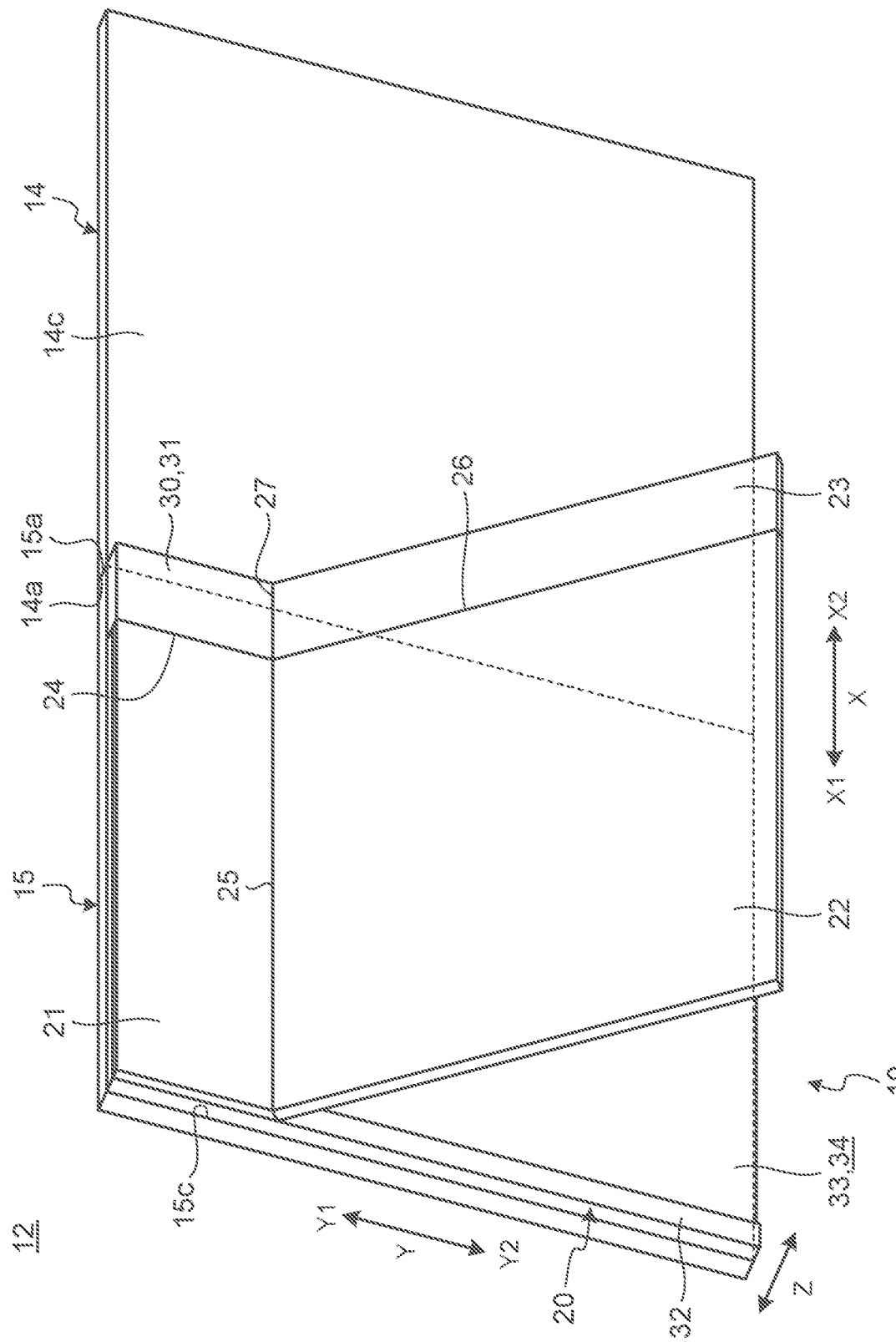
FIG. 2 is a perspective view of the electronic apparatus illustrated in FIG. 1, viewed from the rear face.
Figure 3:
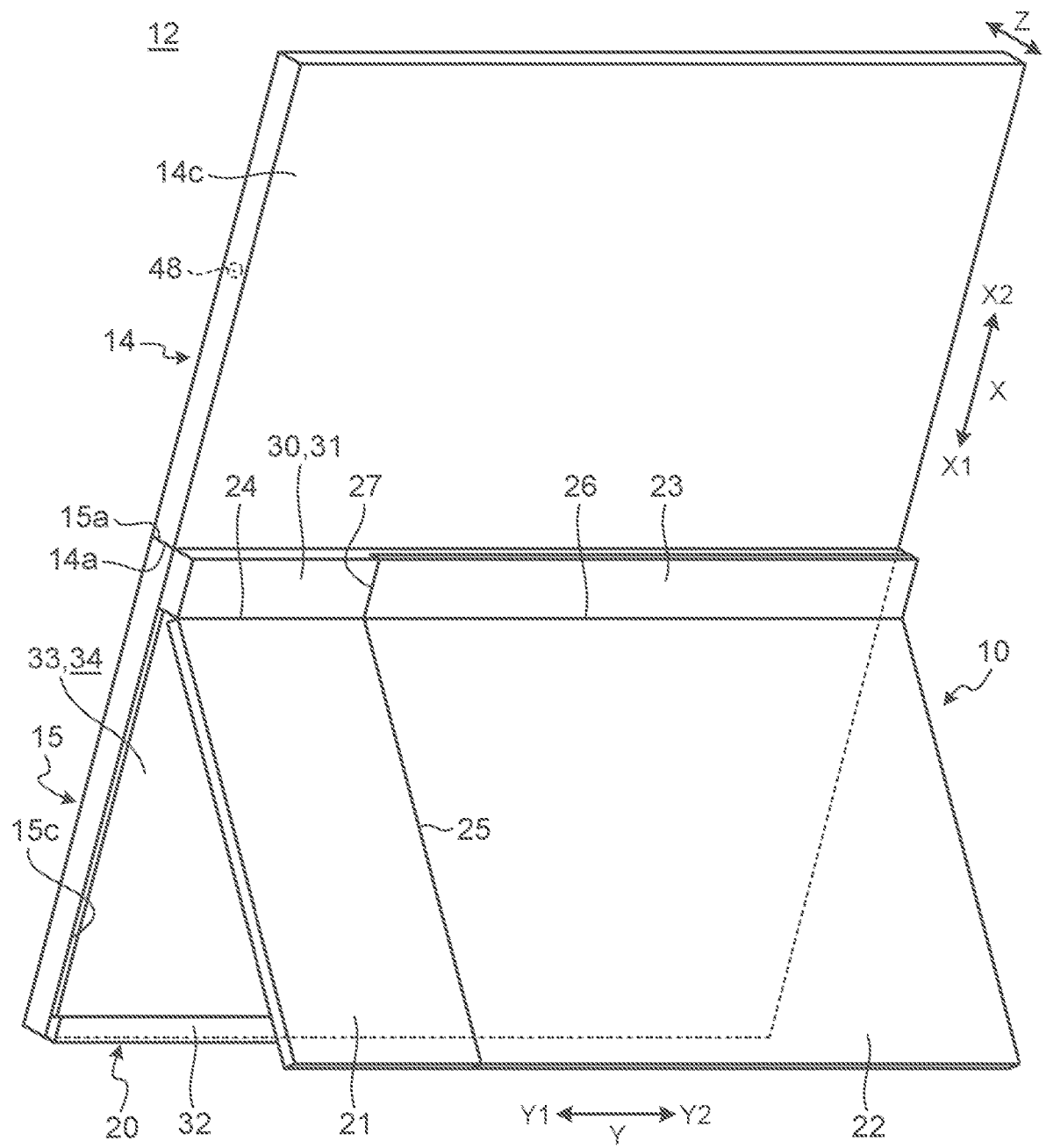
FIG. 3 is a schematic perspective view of the electronic apparatus illustrated in FIG. 1 in a vertical standing posture, viewed from the rear face.

FIG. 1 is a schematic perspective view of an electronic apparatus 12 equipped with a stand device 10 according to one embodiment, in a horizontal standing posture (horizontal mode). FIG. 2 is a perspective view of the electronic apparatus 12 illustrated in FIG. 1, viewed from the rear face. FIG. 3 is a schematic perspective view of the electronic apparatus 12 illustrated in FIG. 1 in a vertical standing posture (vertical mode), viewed from the rear face.

As illustrated in FIGS. 1 to 3, the electronic apparatus 12 includes a first chassis 14, a second chassis 15, a display 16, and a stand device 10. The present embodiment illustrates an example of the electronic apparatus 12 that is a tablet PC or a laptop PC and is foldable like a book. The electronic apparatus 12 may be of other types including a tablet PC, a smartphone, and a portable game machine that include a single plate and are not foldable.

The chassis 14 and 15 are placed adjacently side by side. The chassis 14 and 15 are relatively rotatably connected at their adjacent ends 14a and 15a via a chassis hinge 17 (see FIG. 7). The chassis 14 and 15 rotate relatively between the 0-degree posture (see FIG. 7) and the 180-degree posture (see FIGS. 1 to 3). In the 180-degree posture, the chassis 14 and 15 are placed side by side in the direction perpendicular to the surface normal direction, so that their front faces 14b and 15b are placed side by side to the left and right. In the 0-degree posture, the chassis 14 and 15 are folded in the surface normal direction, so that their front faces 14b and 15b are opposed.

The first chassis 14 accommodates electronic components such as a motherboard 18. In one example, electronic components such as a central processing unit (CPU), a communication module, and memory are mounted on the motherboard 18. The second chassis 15 accommodates electronic components such as a battery device 19. The battery device 19 is a secondary battery that supplies electricity to the electronic apparatus 12, and is the heaviest component among the electronic components mounted on the electronic apparatus 12. The weight of the second chassis 15, including the mounted components, therefore is larger than that of the first chassis 14.

In one example, the display 16 extends over the front faces 14b and 15b of the chassis 14 and 15. The display 16 is a paper-like flexible display that is foldable together with the chassis 14 and 15 when the chassis are folded. In one example, the display 16 is an organic light emitting diode (OLED). As illustrated in FIG. 1, the display 16 has a folding region R that is foldable and located in a range extending across the adjacent ends 14a and 15a of the chassis 14 and 15. The display 16 has a region R1 on the side of the first chassis 14 relative to the folding region R, the region R1 being relatively fixed to the first chassis 14, and a region R2 on the side of the second chassis 15 relative to the folding region R, the region R2 being relatively fixed to the second chassis 15. The display 16 may be a dual display having displays each on the front face 14b or 15b of the chassis 14 and 15.

The following describes the stand device 10, referring to that attached to the electronic apparatus 12 as illustrated in FIGS. 1 to 3. In the following description, the direction of placing the chassis 14 and 15 side by side is referred to as X direction, the direction along the adjacent ends 14a and 15a of the chassis 14 and 15 is referred to as Y direction, and the thickness direction of the chassis 14 and 15 is referred to as Z direction. For X direction, the direction from the first chassis 14 to the second chassis 15 may be referred to as X1 direction, and the opposite direction may be referred to as X2 direction. For Y direction, referring to the electronic apparatus illustrated in FIGS. 1 and 2, the upward may be referred to as Y1 direction, and the downward may be referred to as Y2 direction.

Figure 4:
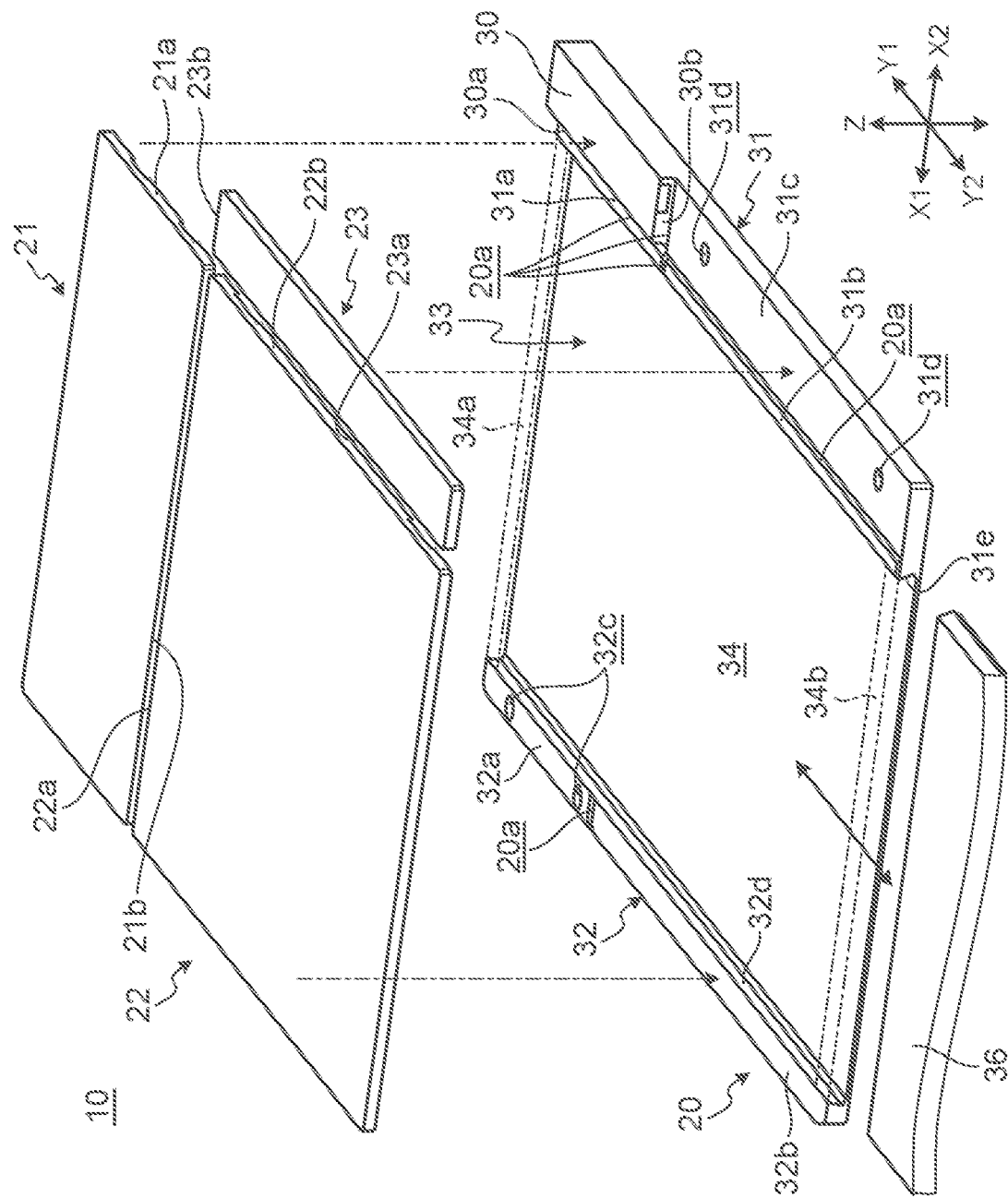
FIG. 4 is an exploded perspective view of the stand device.
Figure 5A:
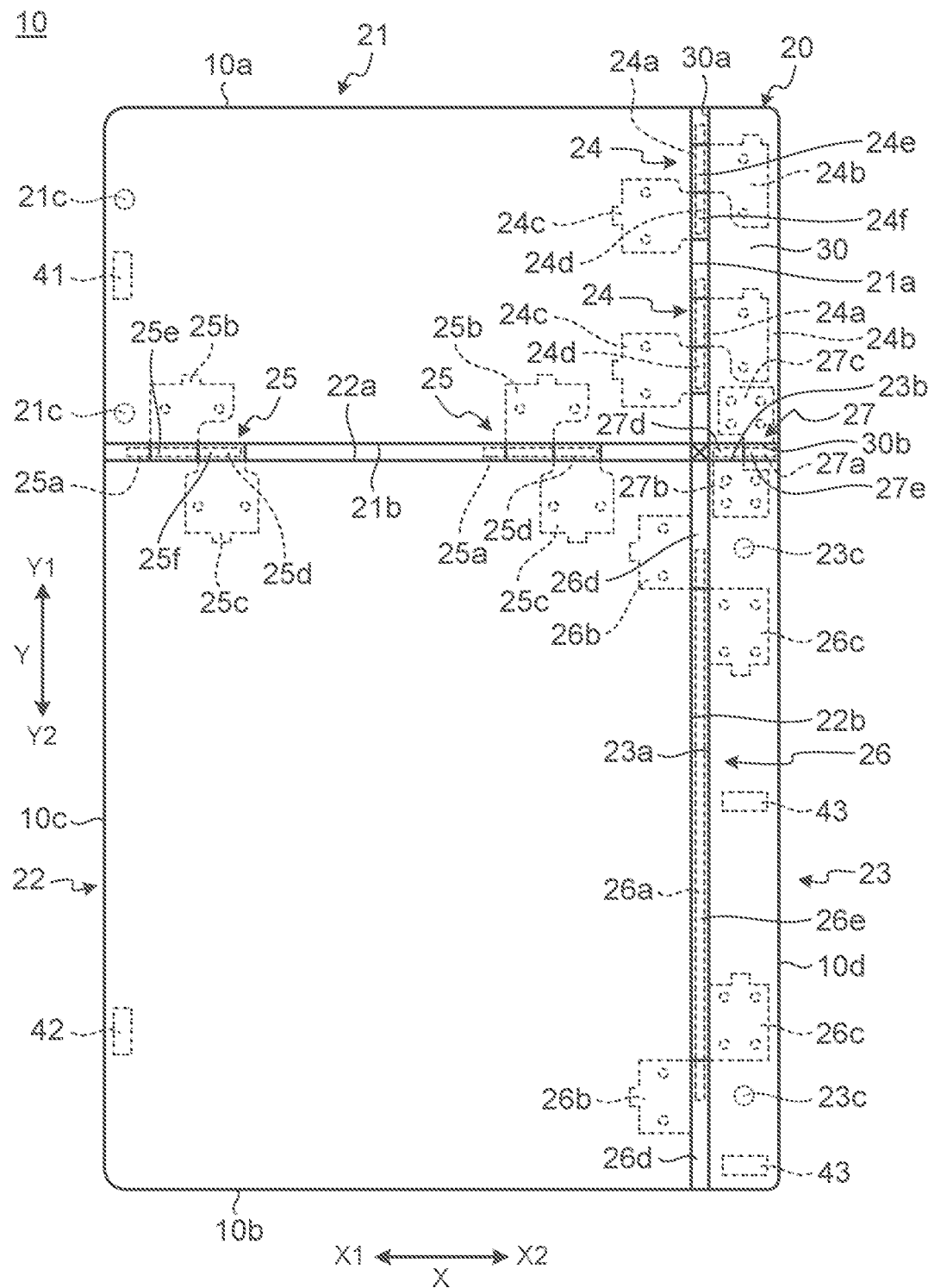
FIG. 5A is a plan view of the stand device.
Figure 5B:
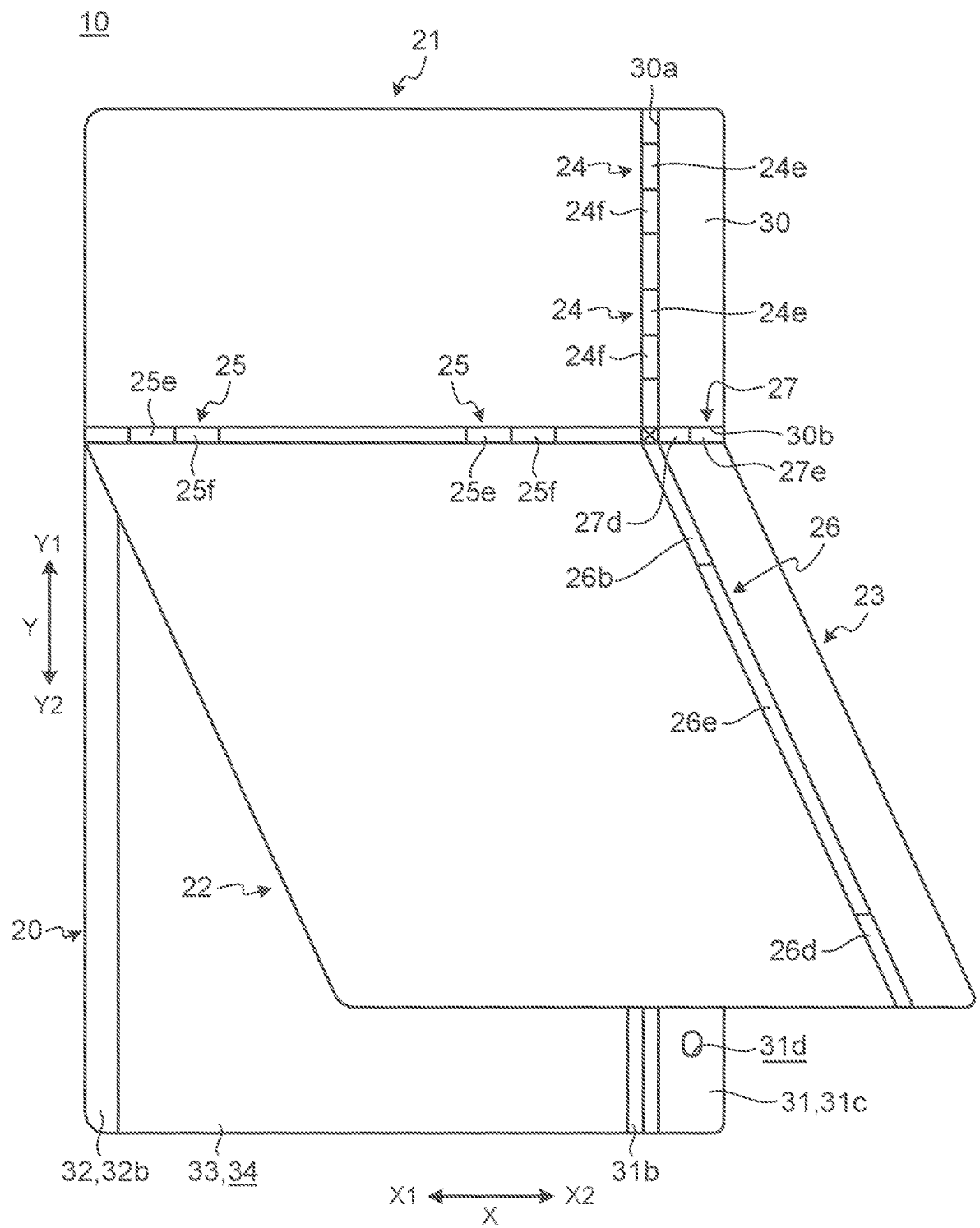
FIG. 5B illustrates the stand device in FIG. 5A for the horizontal mode.
Figure 5C:
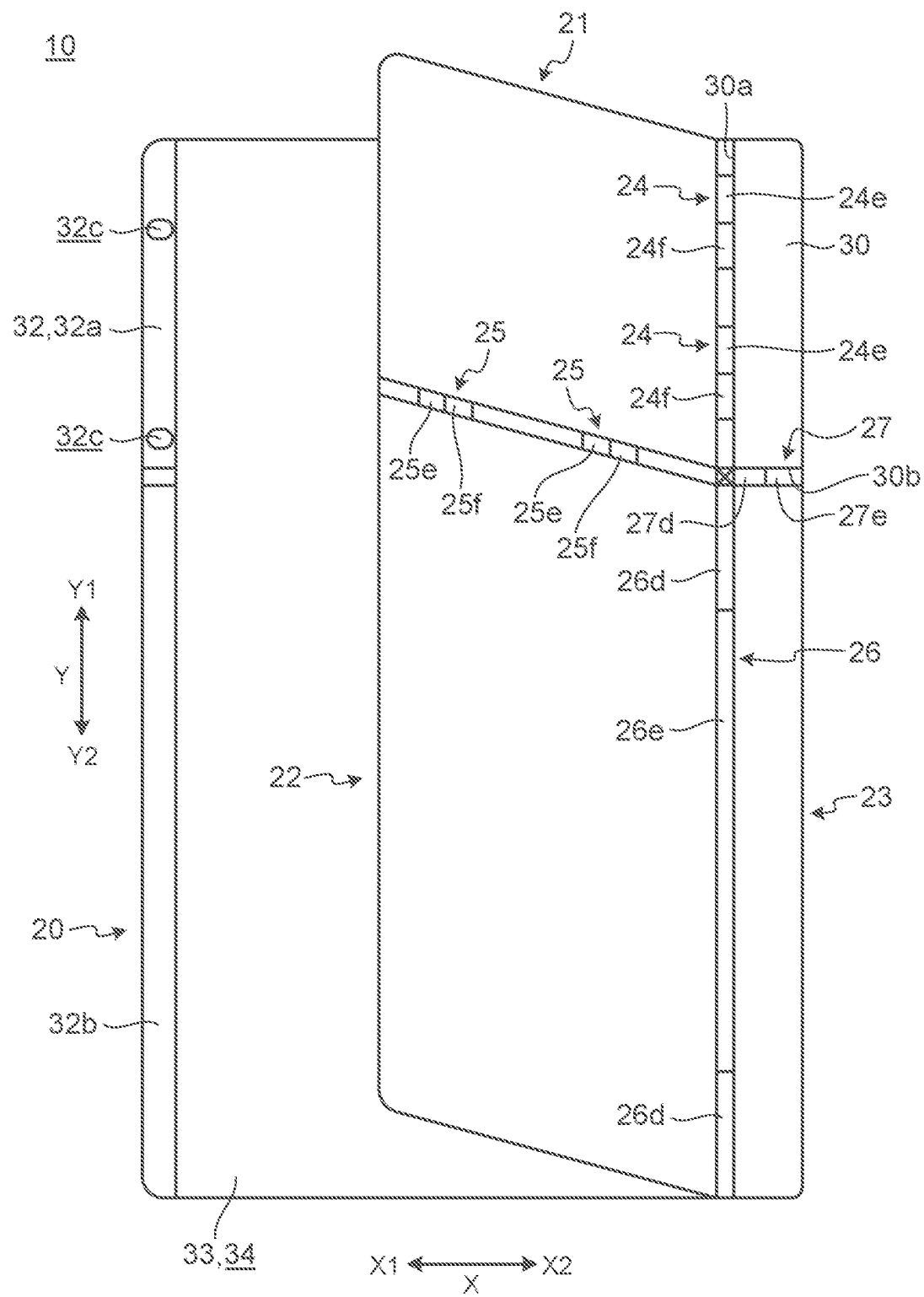
FIG. 5C illustrates the stand device in FIG. 5A for the vertical mode.
Figure 6:
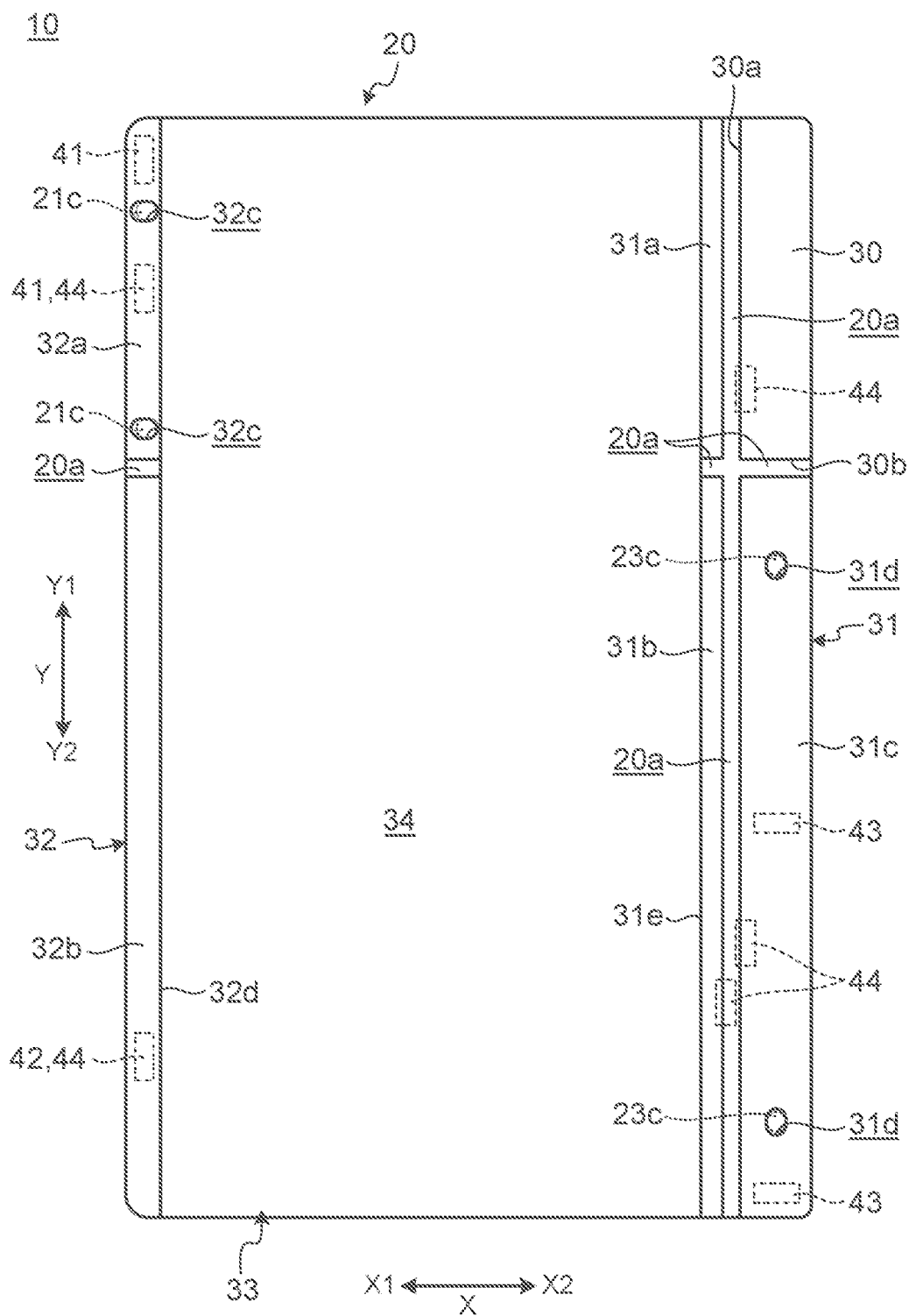
FIG. 6 is a plan view of a base member making up the stand device illustrated in FIG. 5A.
Figure 7:
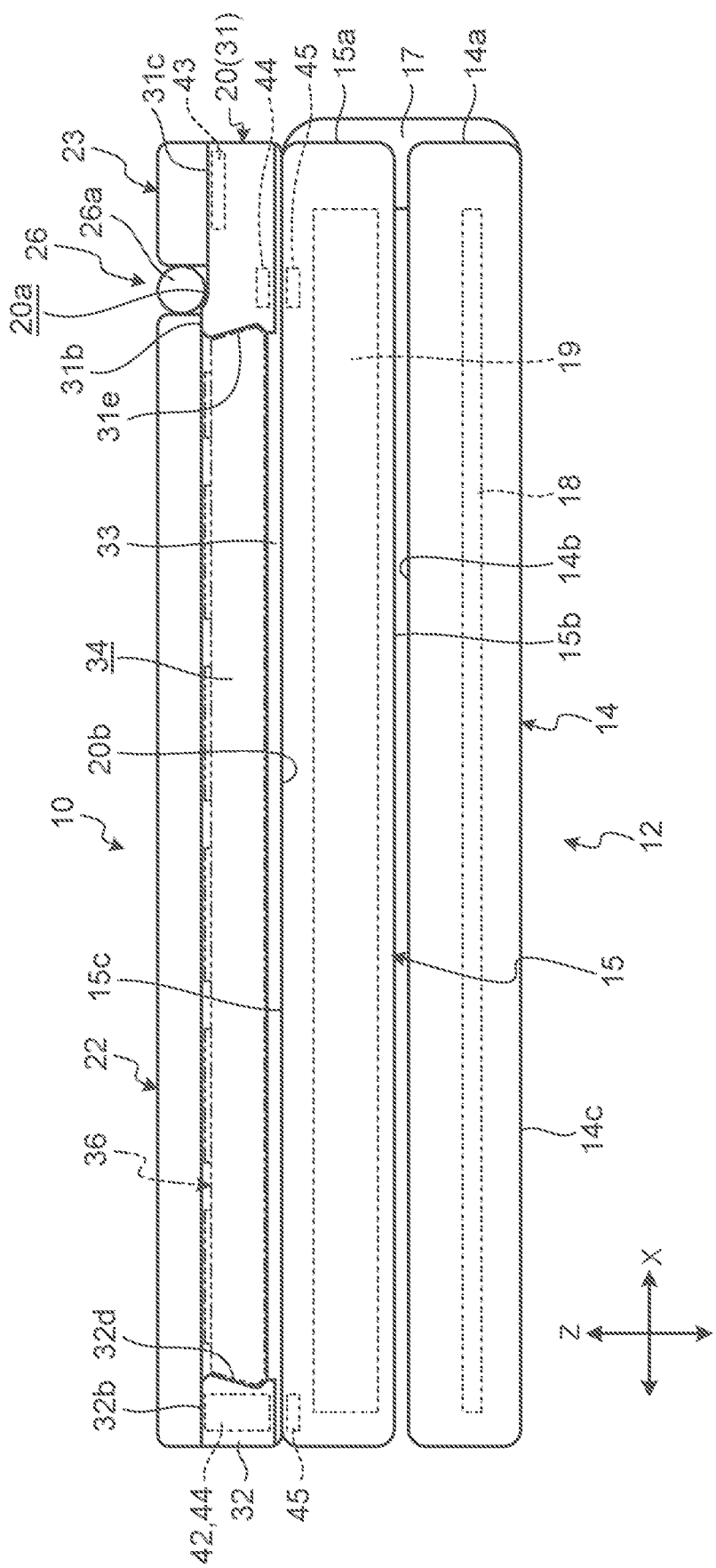
FIG. 7 is a side view of the electronic apparatus, to which the stand device is attached.

Next the following describes a specific configuration example of the stand device 10. FIG. 4 is an exploded perspective view of the stand device 10. FIG. 5A is a plan view of the stand device 10. FIG. 5B illustrates the stand device 10 in FIG. 5A for the horizontal mode. FIG. 5C illustrates the stand device 10 in FIG. 5A for the vertical mode. FIG. 6 is a plan view of a base member 20 making up the stand device 10 illustrated in FIG. 5A. FIG. 7 is a side view of the electronic apparatus 12, to which the stand device 10 is attached.

As illustrated in FIGS. 1 to 3, the stand device 10 supports the electronic apparatus 12 in the horizontal and vertical standing postures. As illustrated in FIGS. 4 and 5A, the stand device 10 includes the base member 20, first to third stand plates 21 to 23, and first to fourth hinge devices 24 to 27 which may be a butt type hinge, a piano type hinge, a living hinge, a combination of hinge types or some other type of hinge. However, as further described below, there may be fewer than four hinges.

As illustrated in FIGS. 1 to 3 and 7, the base member 20 is an attachment of the stand device 10 to the electronic apparatus 12. The base member 20 is also a support for the stand plates 21 to 23.

As illustrated in FIGS. 4 and 6, the base member 20 includes a base block 30, a first frame 31, a second frame 32, a cover plate 33, and a device storage 34.

The first frame 31 is a rod-like plate extending in Y direction and being narrow in X direction. The first frame 31 is placed at an X2-side end of the base member 20. The base block 30 protrudes in Z direction from the Y1-side end of the surface of the first frame 31. The base block 30 is a thin cuboid block. The base block 30 of this embodiment is integrally formed with the first frame 31. The base block 30 may be formed separately from the first frame 31.

The surface of the first frame 31 comes with a first support face 31a, a second support face 31b, and a third support face 31c. These support faces 31a to 31c are located lower than the surface of the base block 30. This difference in height is approximately the same as the thickness of the stand plates 21 to 23.

The first support face 31a extends in Y direction along the X1 side edge (first side face 30a) of the base block 30 and is narrow in X direction. The second support face 31b is aligned with the first support face 31a in the Y2 direction. The second support face 31b has a width in X direction that is the same as that of the first support face 31a, and has a length in Y direction that is longer than that of the first support face 31a. The third support face 31c is located in Y2 direction of the base block 30 and in X2 direction of the second support face 31b. The third support face 31c has a width in X direction that is substantially the same as that of the Y2 side edge (second side face 30b) of the base block 30, and has a length in Y direction that is the same as that of the second support face 31b. The third support face 31c has a pair of holes 31d and 31d arranged in Y direction. Each hole 31d is elliptical in shape with the length in Y direction slightly longer than the length in X direction.

The second frame 32 is placed at an X1-side end of the base member 20 to be parallel to the first frame 31. The second frame 32 is a rod-like plate having a width in X direction that is narrower than that of the first frame 31, and having the same length in Y direction as that of the first frame 31. The surface of the second frame 32 comes with a first support face 32a, and a second support face 32b.

The support faces 32a and 32b have the same height as that of the support faces 31a and 31b of the first frame 31. The first support face 32a has a width in X direction that is slightly larger than that of the first support face 31a, and has a length in Y direction that is the same as that of the first support face 31a. The second support face 32b is aligned with the first support face 32a in the Y2 direction. The second support face 32b has a width in X direction that is slightly larger than that of the second support face 31b, and has a length in Y direction that is the same as that of the second support face 31b. The first support face 32a has a pair of holes 32c and 32c arranged in Y direction. Each hole 32c is elliptical in shape with the length in X direction slightly longer than the length in Y direction.

The cover plate 33 is a plate made of metal such as aluminum, stainless steel, or magnesium. The cover plate 33 connects the left and right frames 31 and 32. The cover plate 33 is thinner than the frames 31 and 32. The cover plate 33 is fixed to the faces of the frames 31 and 32 on the opposite side of the support faces 31a to 31c. This configuration defines a shallow recessed space (device storage 34) between opposing inner side faces 31e and 32d of the frames 31 and 32, and the space has a bottom face blocked with the cover plate 33.

The frames 31 and 32 are resin members. In one example, the cover plate 33 and the frames 31 and 32 are integrated by insert molding. The cover plate 33 may be a resin member. In this case, the cover plate 33 may be formed integrally with the frames 31 and 32, or may be formed separately and connected by bonding, for example.

The device storage 34 is a space for storing a sub-device 36. The sub-device 36 is a device such as a keyboard, which connects to the electronic apparatus 12 wirelessly, for example, for use. Left and right side walls (inner side faces 31e and 32d) of the device storage 34 have a lateral V-shape, that is, an undercut shape (see also FIG. 7). The sub-device 36 has left and right side faces having a lateral V-shape so that they are engageable with the inner side faces 31e and 32d. This configuration allows the sub-device 36 to slide in Y direction relative to the device storage 34 for storage or removal, as illustrated with the arrow in FIG. 4.

As illustrated with the alternate long and two short dashes line in FIG. 4, the device storage 34 may be blocked at both ends in Y direction with standing walls 34a and 34b extending in X direction. In this case, the device storage 34 has a bathtub shape surrounded by the walls at the four peripheral side faces. In that case, the sub-device 36 may be placed in and taken out of this device storage 34 from the above in Z direction, and the device storage 34 does not have to have the undercut shape of the inner side faces 31e and 32d.

As illustrated in FIGS. 4 to 5C, the first stand plate 21 is a rectangular plate supported by the first support faces 31a and 32a of the frames 31 and 32. The first stand plate 21 has a X2-side first edge 21a that faces the first side face 30a of the base block 30. A Y2-side second edge 21b is then aligned with the extension of the second side face 30b of the base block 30. The first stand plate 21 has a pair of pins 21c and 21c protruding from the rear face, and the pins 21c and 21c are engageable with and removable from the holes 32c and 32c of the second frame 32.

The second stand plate 22 is a rectangular plate supported by the second support faces 31b and 32b of the frames 31 and 32. The second stand plate 22 is adjacent to the first stand plate 21 in Y2 direction. The second stand plate 22 has a Y1-side third edge 22a that faces the second edge 21b of the first stand plate 21. A X2-side fourth edge 22b is then aligned with the extension of the first edge 21a of the first stand plate 21.

The third stand plate 23 is a rectangular plate supported by the third support face 31c of the first frame 31. The third stand plate 23 is adjacent to the second stand plate 22 in X2 direction, and is adjacent to the base block 30 in Y2 direction. The third stand plate 23 has a X1-side fifth edge 23a that faces the fourth edge 22b of the second stand plate 22. A Y1-side sixth edge 23b then faces the second side face 30b of the base block 30, and is aligned with the extension of the third edge 22a of the second stand plate 22. The third stand plate 23 has a pair of pins 23c and 23c protruding from the rear face, and the pins 23c and 23c are engageable with and removable from the holes 31d and 31d of the first frame 31.

As illustrated in FIG. 5A, the first hinge device 24 connects the first side face 30a and the first edge 21a to connect the first stand plate 21 rotatably relative to the base block 30. The present embodiment includes a pair of first hinge devices 24 arranged in Y direction, and only one or three or more hinge devices may be used as one set. The same applies to the other hinge devices 25 to 27.

In an alternative embodiment, there is only one first hinge device 24 that rotatably connects the first stand plate 21 to the base block 30, and there are no other hinge devices 25 to 27, or another first hinge device 24. In such embodiment, the only one first hinge device 24 may be relatively long and located at a mid-region of the first edge 21a.

The first hinge device 24 has a hinge shaft 24a, a bracket 24b, a bracket 24c, and a torque generator 24d.

The hinge shaft 24a is a rotation shaft of the first hinge device 24. The hinge shaft 24a is a metal shaft located between the first side face 30a and the first edge 21a, and extends in Y direction along them. The bracket 24b is a metal plate fixed to the base block 30 with pins, screws, or adhesive, for example. The bracket 24b comes with a metal pipe 24e at the proximal end, and the hinge shaft 24a is inserted into the metal pipe 24e so as not to rotate. The bracket 24c is a metal plate fixed to the first stand plate 21. The bracket 24c also comes with a metal pipe 24f at the proximal end, and the hinge shaft 24a is inserted into the metal pipe 24f so as to relatively rotate. The torque generator 24d imparts a predetermined rotational torque to the bracket 24c and the hinge shaft 24a so that they are relatively rotatable. In one example, the torque generator 24d includes the hinge shaft 24a being press-fitted into the pipe 24f of the bracket 24c.

With this configuration, the first hinge device 24 connects the first stand plate 21 rotatably relative to the base block 30, and the torque generator 24d imparts a rotational torque to this rotation. As a result, in response to the opening operation of the first stand plate 21 from the storage position where the first stand plate 21 is in contact with the first support faces 31a and 32a, for example (see FIG. 5C), the first stand plate 21 is able to keep a predetermined angular position.

The second hinge device 25 connects the second edge 21b and the third edge 22a to relatively rotatably connect the first stand plate 21 and the second stand plate 22. The second hinge device 25 includes a pair of the hinge devices arranged in X direction.

The second hinge device 25 has a hinge shaft 25a, a bracket 25b, a bracket 25c, and a torque generator 25d. These components 25a to 25d may be the same or substantially the same as the components 24a to 24d of the first hinge device 24, and their detailed descriptions are omitted.

The hinge shaft 25a is located between the second edge 21b and the third edge 22a. The bracket 25b is fixed to the first stand plate 21. The bracket 25c is fixed to the second stand plate 22. In one example, the hinge shaft 25a is relatively rotatably inserted into a metal pipe 25e at the proximal end of the bracket 25b, and is press-fitted into a metal pipe 25f at the proximal end of the bracket 25c.

With this configuration, the second hinge device 25 relatively rotatably connects the first stand plate 21 and the second stand plate 22, and the torque generator 25d imparts a rotational torque to this rotation. As a result, in response to the opening operation of the second stand plate 22 from the storage position where the second stand plate 22 is in contact with the second support faces 31b and 32b, for example (see FIG. 5B), the second stand plate 22 is able to keep a predetermined angular position.

The third hinge device 26 connects the fourth edge 22b and the fifth edge 23a to relatively rotatably connect the second stand plate 22 and the third stand plate 23.

In an alternative embodiment, there is only one third hinge device 26 that rotatably connects the second stand plate 22 to the third stand plate 23, and there are no other hinge devices 24, 25 and 27. In such embodiment, the only one third hinge device 26 may be relatively long and located at a mid-region of the fifth edge 23a.

The third hinge device 26 has a hinge shaft 26a, a pair of brackets 26b and 26b, and a pair of brackets 26c and 26c. These components 26a to 26c may be the same or substantially the same as the components 24a to 24c of the first hinge device 24, and their detailed descriptions are omitted. The hinge shaft 26a is located between the fourth edge 22b and the fifth edge 23a. The hinge shaft 26a is along the axial extension of the hinge shaft 24a. The pair of brackets 26b is fixed to the second stand plate 22. Each bracket 26b comes with a metal pipe 26d at the proximal end, and the ends of the hinge shaft 26a in Y direction are inserted relatively rotatably in these metal pipes 26d. The pair of brackets 26c is fixed to the third stand plate 23. Each bracket 26c comes with a metal pipe 26e at the proximal end, and the ends of the hinge shaft 26a in Y direction are inserted in these metal pipes 26e so as not to rotate.

With this configuration, the third hinge device 26 relatively rotatably connects the second stand plate 22 and the third stand plate 23, and no rotational torque is imparted to this rotation. Note here that, in response to a rotation of the second stand plate 22 relative to the third stand plate 23, the second stand plate 22 rotates integrally with the first stand plate 21 as illustrated in FIG. 5C. As a result, the second stand plate 22 indirectly receives a rotational torque due to the first hinge device 24, and thus keeps a desired angular position.

The fourth hinge device 27 connects the sixth edge 23b and the second side face 30b to connect the third stand plate 23 rotatably relative to the base block 30.

The fourth hinge device 27 has a hinge shaft 27a, a bracket 27b, and a bracket 27c. These components 27a to 27c may be the same or substantially the same as the components 26a to 26c of the third hinge device 26, and their detailed descriptions are omitted. The hinge shaft 27a is located between the sixth edge 23b and the second side face 30b. The hinge shaft 27a is along the axial extension of the hinge shaft 25a. The bracket 27b is fixed to the third stand plate 23. The bracket 27c is fixed to the base block 30. The brackets 27b and 27c come with metal pipes 27d and 27e at their proximal ends. The hinge shaft 26a is inserted into the metal pipe 27d to be relatively rotatable, and is inserted into the metal pipe 27e so as not to rotate.

With this configuration, the fourth hinge device 27 connects the third stand plate 23 rotatably relative to the base block 30, and no rotational torque is imparted to this rotation. Note here that, in response to a rotation of the third stand plate 23 relative to the base block 30, the third stand plate 23 rotates integrally with the second stand plate 22 as illustrated in FIG. 5B. As a result, the third stand plate 23 indirectly receives a rotational torque due to the second hinge device 25, and thus keeps a desired angular position.

Such a stand device 10 has a rectangular outer shape as a whole that substantially covers the entire rear face 15c of the second chassis 15 in a plan view. This outer shape has a first short side 10a and a second short side 10b parallel to each other, and a first long side 10c and a second long side 10d parallel to each other and orthogonal to the short sides 10a and 10b (see FIG. 5A). The hinge shafts 24a and 26a are parallel to the long sides 10c and 10d. The hinge shafts 25a and 27a are parallel to the short sides 10a and 10b.

Next, the following describes an example of the attachment structure of the stand plates 21 to 23 to the base member 20.

As described above, the first stand plate 21 is attached to the base block 30 of the base member 20 via the first hinge device 24. The third stand plate 23 is attached to the base block 30 via the fourth hinge device 27. The second stand plate 22 is attached to the stand plates 21 and 23 via the hinge devices 25 and 26, and is indirectly attached to the base block 30 via the stand plates 21 and 23. As illustrated in FIGS. 6 and 7, the base member 20 has a groove 20a on the surface at positions overlapping with and under the hinge shafts 24a, 25a, 26a, and 27a. The groove 20a is a recessed portion that receives the outer peripheral surfaces of the hinge shaft 24a and others. The groove 20a prevents the hinge shaft 24a and others from protruding from the surfaces of the stand plates 21 to 23 (see FIG. 7).

When the stand plates 21 to 23 are not used as a stand, they are in storage positions in contact with the support faces 31a to 31c, 32a and 32b. This allows the stand device 10 to have a compact form where the base member 20 and the stand plates 21 to 23 are integrated like a single plate (see FIGS. 5A and 7). This storage position is the form for carrying the electronic apparatus 12, to which the stand device 10 is attached. It is preferable therefore that the stand plates 21 to 23 do not rattle.

To this end, as illustrated in FIGS. 6 and 7, the base member 20 comes with a first magnet 41, a second magnet 42, and a third magnet 43. The stand plates 21 to 23 each include a plate formed of a magnetic material such as thin iron that can be attracted by these magnets 41 to 43, which is covered with a decorative material such as leather. For further weight reduction, the stand plates 21 to 23 may be formed of a reinforced resin plate, for example, and magnets may be embedded at positions corresponding to the magnets 41 to 43. With these configurations, the stand plates 21 to 23 can be attracted by the magnets 41 to 43.

The first magnet 41 is embedded in the second frame 32, and its attracting face faces the first support face 32a. The present embodiment includes a pair of first magnets 41 in Y direction, and one or three or more magnets may be used. The first magnet 41 attracts the first stand plate 21 to hold it in the storage position. The second magnet 42 is embedded in the second frame 32, and its attracting face faces the second support face 32b. The present embodiment includes one second magnet 42, which may be two or more. The second magnet 42 attracts the second stand plate 22 to hold it in the storage position. The third magnet 43 is embedded in the first frame 31, and its attracting face faces the third support face 31c. The present embodiment includes a pair of third magnets 43 in Y direction, and one or three or more magnets may be used. The third magnet 43 attracts the third stand plate 23 to hold it in the storage position.

The stand device 10 may be configured so that the stand plates 21 to 23 include magnets attracting the magnets 41 to 43, instead of the stand plates made of a magnetic material. The stand device 10 may be configured so that the stand plates 21 to 23 include the magnets 41 to 43, and the base member 20 includes a magnetic material. Note that the stand plates 21 to 23 including a plate made of a magnetic material have the advantage of making the plates thinner than the configuration including magnets.

Next, the following describes an example of the attachment structure of the stand device 10 to the electronic apparatus 12. The stand device 10 is detachably attached to the rear face 15c of the second chassis 15 by the attractive force of the magnets.

As illustrated in FIGS. 6 and 7, the base member 20 includes magnets 44 in the vicinity of the four corners. These magnets 44 are embedded in the frames 31 and 32, and their attracting faces face the rear face 20b of the base member 20. In the present embodiment, the two magnets 44 in the second frame 32 double as the first magnet 41 or the second magnet 42 described above. As illustrated in FIG. 7, the second chassis 15 also includes four magnets 45 at positions overlapping with the four magnets 44 in a plan view. The magnets 45 are disposed in the second chassis 15, and their attracting faces face the rear face 15c.

One of these magnets 44 and 45 has the attracting face as N pole and the other has the attracting face as S pole to firmly attract each other. With this configuration, the stand device 10 is firmly attached to the electronic apparatus 12 by the magnets 44 and 45. The stand device 10 can be easily removed from the electronic apparatus 12. The stand device 10 may be detachably attached to the electronic apparatus 12 with pins or hooks. The stand device 10 may be fixed to the electronic apparatus 12 to be substantially not removable with screws or hooks.

Next the following describes the operation of the stand device 10 having the configuration as stated above.

First, the operation of placing the electronic apparatus 12 in the horizontal mode illustrated in FIG. 1 will be described.

In this operation, the user lifts the second short side 10b of the stand device 10 in the storage position, that is, the edge corresponding to the second short side 10b of the stand plates 22 and 23. In response to this, the hinge devices 25 and 27 having the rotation axis in X direction operate in the stand device 10, so that the stand plates 22 and 23 are lifted together (see FIG. 5B). As a result, the electronic apparatus 12 stands on the top surface of a desk, for example, in the horizontal mode illustrated in FIGS. 1 and 2. In this state, the edges of the stand plates 22 and 23 of the stand device 10 that have a large width in X direction come into contact with the top surface of the desk. This allows the stand device 10 to stably stand the electronic apparatus 12 in the horizontal mode.

In this operation, the first stand plate 21, which does not rotate, keeps engagement of the pins 21c protruding from the rear face with the holes 32c of the base member 20. This suppresses accidentally lifting of the first stand plate 21 when the user lifts the stand plates 22 and 23 serving as kickstands.

Next, the operation of placing the electronic apparatus 12 in the vertical mode illustrated in FIG. 3 will be described.

In this operation, the user lifts the first long side 10c of the stand device 10 in the storage position, that is, the edge corresponding to the first long side 10c of the stand plates 21 and 22. In response to this, the hinge devices 24 and 26 having the rotation axis in Y direction operate in the stand device 10, so that the stand plates 21 and 22 are lifted together (see FIG. 5C). As a result, the electronic apparatus 12 stands on the top surface of a desk, for example, in the vertical mode illustrated in FIG. 3. In this state, the edges of the stand plates 21 and 22 of the stand device 10 that have a large width in Y direction come into contact with the top surface of the desk. This allows the stand device 10 to stably stand the electronic apparatus 12 in the vertical mode.

In this operation, the third stand plate 23, which does not rotate, keeps engagement of the pins 23c protruding from the rear face with the holes 31d of the base member 20. This suppresses accidentally lifting of the third stand plate 23 when the user lifts the stand plates 21 and 22 serving as kickstands.

Note that the stand device 10 of the present embodiment includes the base block 30 to face the corner where the first short side 10a and the second long side 10d intersect (the upper right corner in FIG. 5A). The hinge devices 24 and 26, which have a rotation axis in Y direction, are located closer to the second long side 10d than to the first long side 10c. That is, the hinge shafts 24a and 26a are offset from the center of X direction toward the X2 side. The hinge devices 25 and 27, which have a rotation axis in X direction, are located closer to the first short side 10a than to the second short side 10b. That is, the hinge shafts 25a and 27a are offset from the center of Y direction toward the Y1 side.

This means that, in the horizontal mode illustrated in FIGS. 1 and 5B, the hinge shafts 25a and 27a as the rotation shafts are located closer to the top (Y1 side) in the upright direction (Y direction). Therefore, in the horizontal mode, the supporting points of the stand plates 22 and 23 that serve as kickstands, that is, the hinge shafts 25a and 27a are placed closer to the top (Y1 side). At the same time, this mode keeps a large width of the stand plates 22 and 23 in Y direction. As a result, the stand device 10 has further improved stability in the horizontal mode.

Similarly, in the vertical mode illustrated in FIGS. 3 and 5C, the hinge shafts 24a and 26a as the rotation shafts are located closer to the top (X2 side) in the upright direction (X direction). Therefore, in the vertical mode, the supporting points of the stand plates 21 and 22 that serve as kickstands, that is, the hinge shafts 24a and 26a are placed closer to the top (X2 side). At the same time, this mode keeps a large width of the stand plates 21 and 22 in X direction. As a result, the stand device 10 has further improved stability in the vertical mode.

In the stand device 10 of the present embodiment, the torque generator 25d is provided only in the second hinge device 25 between the hinge devices 25 and 27 operating in the horizontal mode. Similarly in the stand device 10, the torque generator 24d is provided only in the first hinge device 24 between the hinge devices 24 and 26 operating in the vertical mode. The torque generator may be provided in both hinge devices 25 and 27, or only in the fourth hinge device 27. Similarly the torque generator may be provided in both hinge devices 24 and 26, or only in the third hinge device 26.

Preferably, however, the torque generators are provided in the hinge devices 24 and 25 for proper rotation prevention action of the stand plates 21 and 23 with the pins 21c and 23c. In particular, the torque generators provided there are effective in the vertical mode having a large load from the electronic apparatus 12. A torque generator in the third hinge device 26, if any, may cause the rotation of the third stand plate 23 following the second stand plate 22 due to the torque in the vertical mode illustrated in FIGS. 3 and 5C, which may forcibly pull out the pins 23c from the holes 31d. Considering this, it may seem that the torque generator 25d should be provided in the fourth hinge device 27 and not in the second hinge device 25. The fourth hinge device 27 of the present embodiment, however, is not able to generate sufficient torque because of the lack of sufficient installation space for the torque generator. The torque generator 25d therefore is placed in the second torque device 25. The stand device in the horizontal mode has a small load particularly from the electronic apparatus 12 compared to in the vertical mode. The torque generator 25d therefore may be provided in the first stand plate 21, and a sufficient function of avoiding the pins 21c from coming off can be expected.

As illustrated in FIG. 3, the electronic apparatus 12 of the present embodiment includes the foldable chassis 14 and 15. The electronic apparatus therefore is taller in the vertical direction in the vertical mode, which may make the apparatus more unstable. The electronic apparatus therefore has the stand device 10 attached to the rear face 15c of the second chassis 15, which weighs more than the first chassis 14. This means that the heavy part is placed at the bottom in the vertical mode, and thus the stability improves. The camera 48 is mounted toward the front face 14b of the first chassis 14 (see FIG. 1). That is, the camera 48 is placed in the first chassis 14 located upward in the vertical mode illustrated in FIG. 3. In this way, the camera 48 is placed in an appropriate position at the top in both the horizontal and vertical modes. The stand device 10 may be attached to the first chassis 14.

Figure 8:
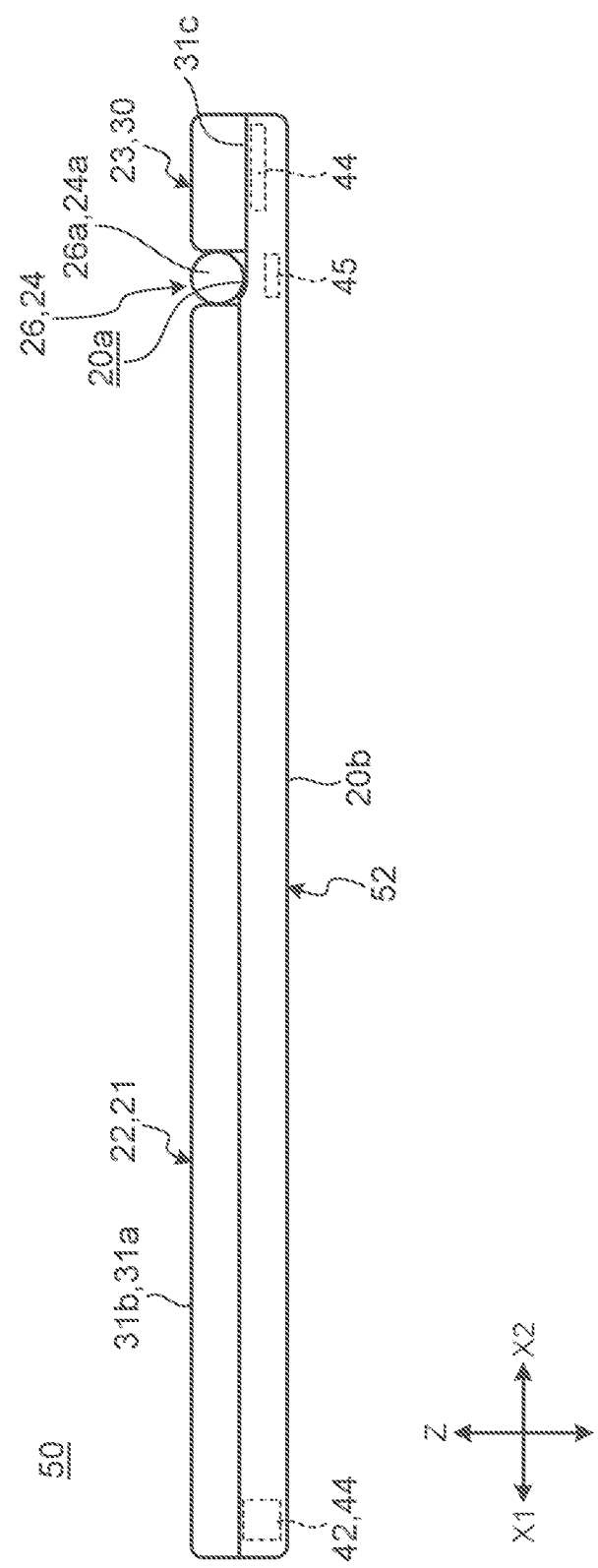
FIG. 8 is a side view of a stand device according to a first modified example.

FIG. 8 is a side view of a stand device 50 according to a first modified example. In FIG. 8, like reference numerals indicate like parts having the same or similar configurations in FIGS. 1 through 7 and thus the same functions and advantageous effects, and their detailed description is omitted. The same applies to FIGS. 9 to 10B.

The stand device 50 illustrated in FIG. 8 includes a base member 52 without a device storage 34, instead of the base member 20. The base member 52 is a plate made of resin. The base member 52 does not have the device storage 34, and thus is thinner than the base member 20. The base member 52 has support faces 31a and 31b (or support faces 32a and 32b) as the surfaces that support the stand plates 21 and 22, and has a third support face 31c that supports the third stand plate 23.

The stand device 50 having this configuration is thinner than the stand device 10, because it includes the base member 52 without the device storage 34.

Figure 9:
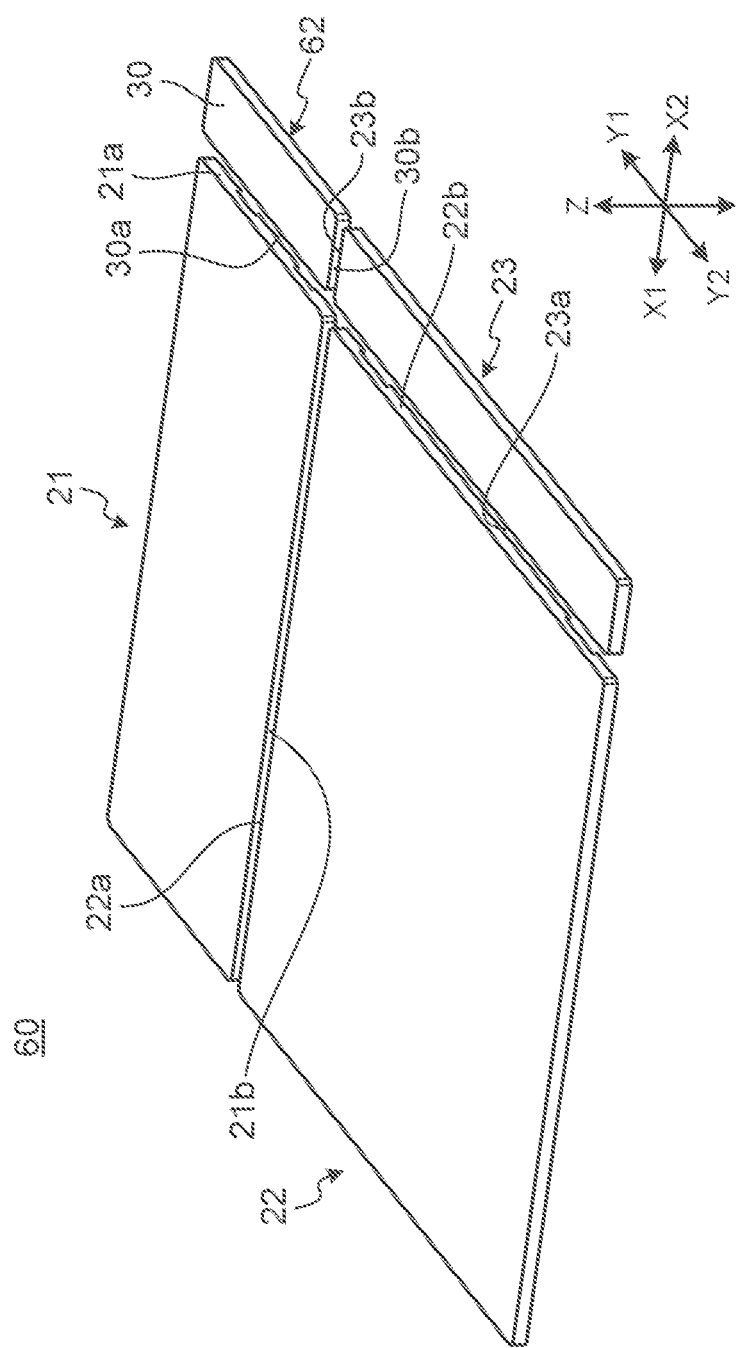
FIG. 9 is a side view of a stand device according to a second modified example.

FIG. 9 is a side view of a stand device 60 according to a second modified example.

The stand device 60 illustrated in FIG. 9 includes a base member 62 instead of the base member 20 (52). The base member 62 does not have a plate portion, and includes substantially the base block 30 only. In the stand device 60, the base member 62 is fixed to the second chassis 15 with magnets 44 and 45 or by screwing. The stand plate 21 to 23 come with magnets 41 to 43 to attract the rear face 15c of the second chassis 15, which prevents rattling at the 0 degree position.

The stand device 60 having this configuration is thinner than the stand devices 10 and 50, because it does not have a plate portion of the base member 62. Note that the stand device 60 is fixed to the electronic apparatus 12 substantially only at the base block 30. This makes it difficult to increase the fixing strength of the stand device 60 to the electronic apparatus 12 as compared to the stand devices 10 and 50.

Figure 10A:
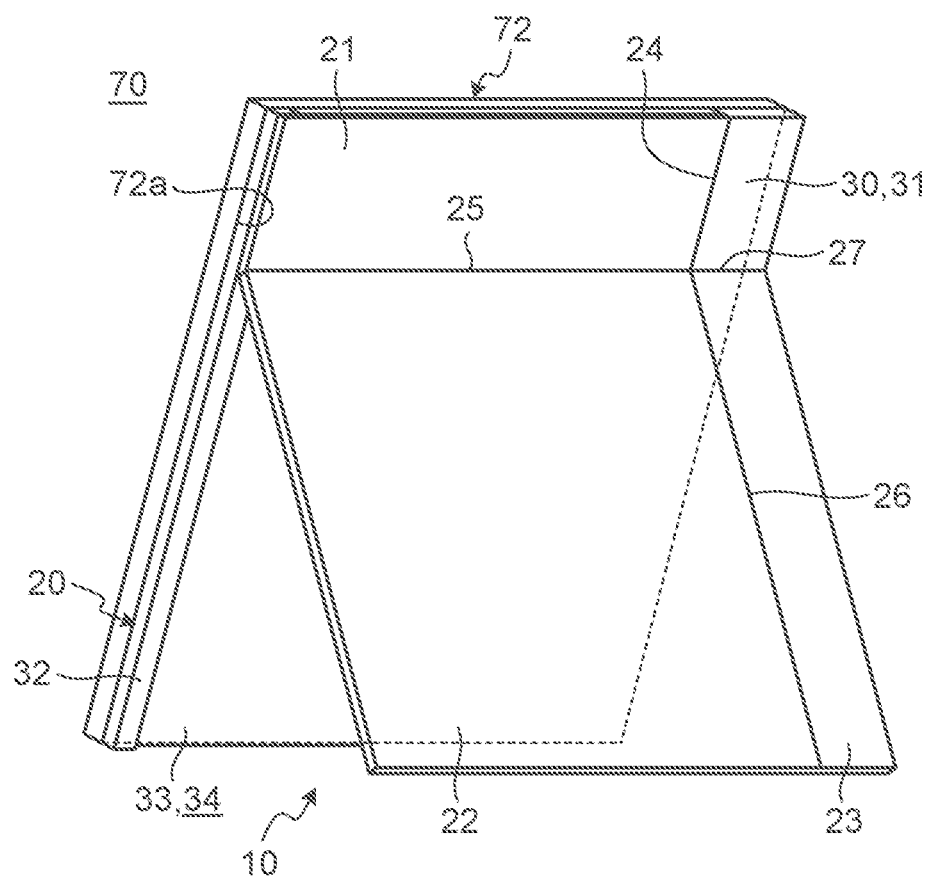
FIG. 10A is a schematic perspective view of an electronic apparatus according to one modified example, to which a stand device is attached, in the vertical posture.
Figure 10B:
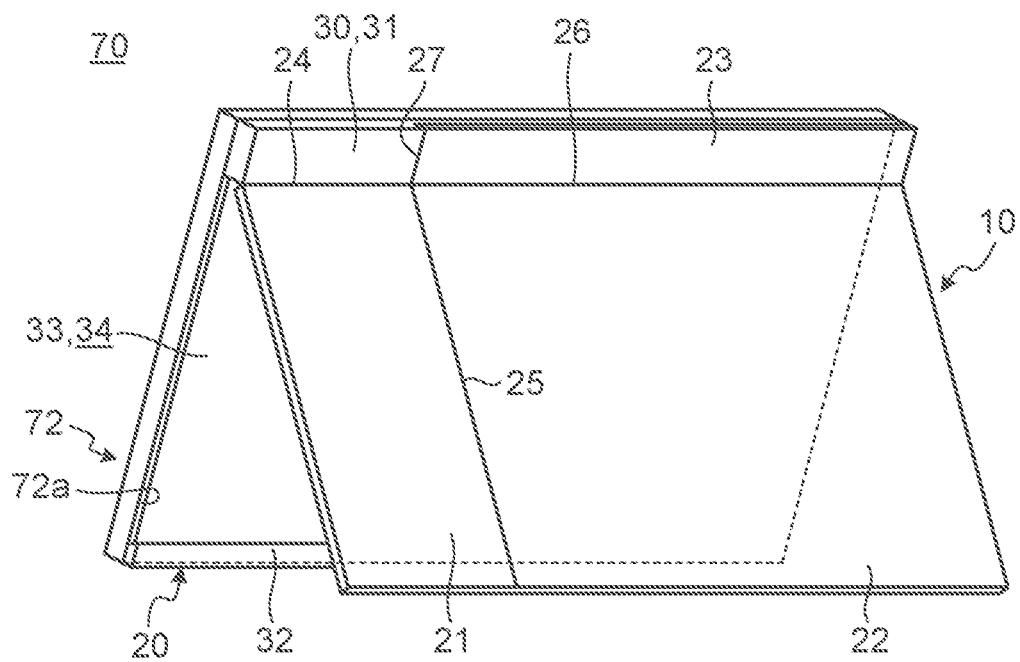
FIG. 10B is a perspective view of the electronic apparatus of FIG. 10A in the horizontal posture.

FIG. 10A is a schematic perspective view of an electronic apparatus 70 according to a modified example, to which the stand device 10 is attached, in the vertical mode. FIG. 10B is a perspective view of the electronic apparatus 70 in FIG. 10A in the horizontal mode.

The electronic apparatus 12 described above is a foldable tablet PC. The electronic apparatus 70 illustrated in FIGS. 10A and 10B is a single-plate tablet PC.

Specifically, the stand device 10 (50, 60) is mounted to chassis 72 of the electronic apparatus 70 so as to cover the entire rear face 72a. In the electronic apparatus 70 in the vertical mode illustrated in FIG. 10A, the stand plates 22 and 23 function as kickstands. In the horizontal mode illustrated in FIG. 10B, the stand plates 21 and 22 function as kickstands. The stand device 50 or 60 may be used for the electronic apparatus 70, instead of the stand device 10.

The present invention is not limited to the above-described embodiments, and can be modified freely without deviating from the scope of the present invention.

The torque generators 24d and 25d may have any configuration as long as they keep the storage position of the stand plates 21 to 23 and the standing positions at one or more angular positions. In one example, the torque generators may include a ratchet structure that generates torque at predetermined angular positions in the range from the storage position to a predetermined standing position to hold the positions.

The electronic apparatus to which the stand device 10 or the like is mounted may be other apparatuses such as a mobile monitor.

The invention claimed is:

1. A stand device comprising:
   a base block having a first side face and a second side face intersecting the first side face;
   a first stand plate rotatably connected to the base block, the first stand plate having a first edge opposed to the first side face, and having a second edge intersecting the first edge and aligning with an extension of the second side face;
   a second stand plate rotatably connected to the first stand plate, the second stand plate having a third edge opposed to the second edge, and having a fourth edge intersecting the third edge and aligning with an extension of the first edge;
   a third stand plate rotatably connected to the second stand plate and the base block, the third stand plate having a fifth edge opposed to the fourth edge, and having a sixth edge intersecting the fifth edge and being opposed to the second side face and aligning with an extension of the third edge;
   a first hinge device that is disposed on a rotation axis of the first stand plate and the base block;
   another hinge device that is disposed on a rotation axis of the third stand plate and the base block;
   a base member having a surface, the surface having support faces for the first stand plate, the second stand plate, and the third stand plate;
   a first magnet detachably holding the first stand plate with the base member;
   a second magnet detachably holding the second stand plate with the base member;
   a third magnet detachably holding the third stand plate with the base member;
   the base member further includes another magnet detachably holding the stand device to a chassis of an electronic apparatus; and the base member has a device storage configured to accommodate a sub-device to be connected to the electronic apparatus.

2. A stand device comprising:

a base block having a first side face and a second side face intersecting the first side face;

a first stand plate rotatably connected to the base block, the first stand plate having a first edge opposed to the first side face, and having a second edge intersecting the first edge and aligning with an extension of the second side face;

a second stand plate rotatably connected to the first stand plate, the second stand plate having a third edge opposed to the second edge, and having a fourth edge intersecting the third edge and aligning with an extension of the first edge;

a third stand plate rotatably connected to the second stand plate and the base block, the third stand plate having a fifth edge opposed to the fourth edge, and having a sixth edge intersecting the fifth edge and being opposed to the second side face and aligning with an extension of the third edge;

a first hinge device that is disposed on a rotation axis of the first stand plate and the base block;

a second hinge device that connects the second edge and the third edge whereby the first stand plate is rotatable relative to the second stand plate; and a third hinge device that connects the fourth edge and the fifth edge whereby the second stand plate is rotatable relative to the third stand plate;

a fourth hinge device that is disposed on a rotation axis of the third stand plate and the base block; and wherein the first hinge device connects the first side face and the first edge whereby the first stand plate is rotatable relative to the base block;

the fourth hinge device that connects the fifth edge and the second side face whereby the third stand plate is rotatable relative to the base block, the third hinge device having a rotation axis on an extension of the rotation axis of the first hinge device, the fourth hinge device having a rotation axis on an extension of a rotation axis of the second hinge device;

at least one of the first hinge device and the third hinge device has a torque generator, and at least one of the second hinge device and the fourth hinge device has another torque generator.

3. A stand device comprising:

a base block having a first side face and a second side face intersecting the first side face;

a first stand plate rotatably connected to the base block, the first stand plate having a first edge opposed to the first side face, and having a second edge intersecting the first edge and aligning with an extension of the second side face;

a second stand plate rotatably connected to the first stand plate, the second stand plate having a third edge opposed to the second edge, and having a fourth edge intersecting the third edge and aligning with an extension of the first edge;

a third stand plate rotatably connected to the second stand plate and the base block, the third stand plate having a fifth edge opposed to the fourth edge, and having a sixth edge intersecting the fifth edge and being opposed to the second side face and aligning with an extension of the third edge;

a first hinge device that is disposed on a rotation axis of the first stand plate and the base block;

a second hinge device that connects the second edge and the third edge whereby the first stand plate is rotatable relative to the second stand plate; and a third hinge device that connects the fourth edge and the fifth edge whereby the second stand plate is rotatable relative to the third stand plate;

a fourth hinge device that is disposed on a rotation axis of the third stand plate and the base block;

the first hinge device connects the first side face and the first edge whereby the first stand plate is rotatable relative to the base block;

the fourth hinge device that connects the fifth edge and the second side face whereby the third stand plate is rotatable relative to the base block, the third hinge device having a rotation axis on an extension of the rotation axis of the first hinge device, the fourth hinge device having a rotation axis on an extension of a rotation axis of the second hinge device; and wherein:

the stand device has a rectangular outer shape, the outer shape has a first short side and a second short side parallel to the first short side, and has a first long side and a second long side parallel to the first long side, and orthogonal to the first short side and to the second short side, the rotation axes of the first hinge device and of the third hinge device are parallel to the first long side and to the second long side, and the rotation axes of the second hinge device and of the fourth hinge device are parallel to the first short side and to the second short side.

4. The stand device according to claim 3, wherein:

the base block faces a corner where the first short side and the second long side intersect, the first hinge device and the third hinge device are located closer to the second long side than to the first long side, and the second hinge device and the fourth hinge device are located closer to the first short side than to the second short side.

* * * * *